(12) United States Patent
Dai (10) Patent No.: US 10,028,287 B2
(45) Date of Patent: Jul. 17, 2018

(54) METHOD FOR DETECTING DATA TRANSMISSION AND DATA RECEPTION, AND BASE STATION AND USER DEVICE

(71) Applicant: China Academy of Telecommunications Technology, Beijing (CN)

(72) Inventor: Xiaoming Dai, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 174 days.

(21) Appl. No.: 15/121,367

(22) PCT Filed: Feb. 16, 2015

(86) PCT No.: PCT/CN2015/073201
§ 371 (c)(1),
(2) Date: Oct. 27, 2016

(87) PCT Pub. No.: WO2015/127885
PCT Pub. Date: Sep. 3, 2015

(65) Prior Publication Data
US 2017/0265199 A1    Sep. 14, 2017

(30) Foreign Application Priority Data
Feb. 26, 2014 (CN) .......................... 2014 1 0067167

(51) Int. Cl.
*H04W 72/08* (2009.01)
*H04L 5/00* (2006.01)
(Continued)

(52) U.S. Cl.
CPC ........ *H04W 72/082* (2013.01); *H04B 7/0615* (2013.01); *H04L 5/0023* (2013.01); *H04W 72/048* (2013.01)

(58) Field of Classification Search
CPC .............. H04W 72/082; H04W 72/048; H04B 7/0615; H04L 5/0023
See application file for complete search history.

(56) References Cited

U.S. PATENT DOCUMENTS

2007/0250638 A1    10/2007    Kiran et al.

FOREIGN PATENT DOCUMENTS

| CN | 101433005 A | 5/2009 |
|----|-------------|--------|
| CN | 101507347 A | 8/2009 |

(Continued)

OTHER PUBLICATIONS

Translation of International Search Report corresponding to PCT/CN2015/073201, dated May 11, 2015.

*Primary Examiner* — Mohammad S Anwar
(74) *Attorney, Agent, or Firm* — Kilpatrick Townsend & Stockton LLP (57) ABSTRACT

A non-orthogonal method for detecting data transmission and data reception, and base station and user device, relating to communication technology; when the base station sends data, first multiplying a plurality of data by means of by a weighted value and/or implementing conjugate processing, then mapping the data onto physical resources, the amount thereof being no greater than the amount of data, each data in the plurality of data resources being mapped to at least one physical resource, and the amount of physical resources each data is mapped to not being completely the same; and then sending the data on the physical resources, thereby sending more data by means of less physical resources, improving the data transmission capacity of a communication system.

16 Claims, 5 Drawing Sheets (51) Int. Cl.
*H04W 72/04* (2009.01)
*H04B 7/06* (2006.01)

(56) References Cited

FOREIGN PATENT DOCUMENTS

| | | |
|---|---|---|
| CN | 103518339 A | 1/2014 |
| JP | 2013247513 A | 12/2013 |
| WO | 2008/025373 A1 | 3/2008 |
| WO | 2013176042 A1 | 11/2013 |

Time/frequency/space

METHOD FOR DETECTING DATA TRANSMISSION AND DATA RECEPTION, AND BASE STATION AND USER DEVICE

This application is a US National Stage of International Application PCT/CN2015/073201, filed on Feb. 16, 2015, designating the United States, and claiming the benefit of Chinese Patent Application No. 201410067167.X, filed with the Chinese Patent Office on Feb. 26, 2014 and entitled "A method for transmitting data, a method for receiving and detecting data, a base station, and a user equipment", which is hereby incorporated by reference in its entirety.

FIELD

The present invention relates to the field of communications, and particularly to a method for transmitting data, a method for receiving and detecting data, a base station, and a user equipment.

BACKGROUND

Figure 1:
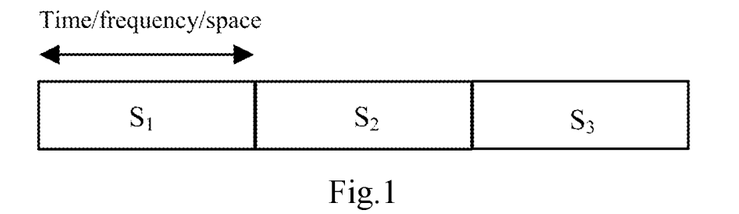
FIG. 1 is a schematic diagram of orthogonal data transmission in the prior art.

The $4^{th}$ Generation (4G) mobile communication system is deigned with the underlying ideas of a linear receiver and orthogonal transmission. The linear receiver is adopted because the linear receiver is easy to implement in engineering while guaranteeing the performance thereof; and orthogonal transmission is adopted so that a receiver can be easy to implement in engineering due to orthogonal transmission. FIG. 1 is a schematic diagram of the orthogonal design where different data are transmitted respectively over orthogonal physical resources in such a way that each of the data is transmitted over corresponding each of the physical resources, and the respective data are orthogonal without any interference to each other.

The capacity of a multi-user transmission system is out of reach by the orthogonal system due to a limited number of radio resources. A drawback in orthogonal transmission of data lies in a low capacity of the system, i.e., a low data transmission capacity of the system.

At present, a non-orthogonal multi-access mode has become possible based on energy allocation principle as proposed by NTT DoCoMo Corp (see WO2012161080), and although there is a performance gain relative to the orthogonal system, energy may not be allocated freely, so the capacity of the system may still be insufficient, and the data transmission capacity of the system may still be low.

SUMMARY

Embodiments of the invention provide a method for transmitting data, a method for receiving and detecting data, a base station, and a user equipment, in a non-orthogonal mode so as to improve the data transmission capacity of a communication system.

An embodiment of the invention provides a method for transmitting data, the method including:

mapping multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other; and transmitting the data over the physical resources.

An embodiment of the invention further provides a method for receiving and detecting data, the method including:

receiving, by a UE, data transmitted by a base station over multiple physical resources; and detecting, by the UE, the data mapped onto the multiple physical resources according to mapping mode, wherein the number of pieces of data mapped onto the physical resources is no less than the number of physical resources, each piece of data is mapped onto at least one of the physical resources, and the number of physical resources onto which each piece of data is mapped is not exactly the same as each other; and the pieces of data are divided into multiple layers, wherein the data in different layers are multiplied with different weights, the weight of the preceding layer is more than the weight of the succeeding layer, and the different data in the same layer are multiplied with the same weight; and/or data in each layer are conjugated.

An embodiment of the invention further provides a base station including:

a mapping unit configured to map multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other; and a transmitting unit configured to transmit the data over the physical resources.

An embodiment of the invention further provides a user equipment including:

a receiving unit configured to receive data transmitted by a base station over multiple physical resources; and a detecting unit configured to detect the data mapped onto the multiple physical resources according to mapping mode, wherein the number of pieces of data mapped onto the physical resources is no less than the number of physical resources, each piece of data is mapped onto at least one of the physical resources, and the number of physical resources onto which each piece of data is mapped is not exactly the same as each other; and the pieces of data are divided into multiple layers, wherein the data in different layers are multiplied with different weights, the weight of the preceding layer is more than the weight of the succeeding layer, and the different data in the same layer are multiplied with the same weight; and/or data in each layer are conjugated.

An embodiment of the invention further provides a base station including:

a transceiver, a processor, a memory, and a bus interface, wherein the processor and the memory are connected with the transceiver through the bus interface;

the processor is configured with one or more executable programs configured to perform a method including: mapping multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other;

the transceiver is configured to transmit the data over the physical resources;

the memory is configured to store the one or more executable programs for configuring the processor; and the bus interface is configured to serve as an interface, the processor is responsible for managing the bus architecture and performing other normal processes, and the memory is configured to store data for use by the processor in operation.

Based upon the same inventive concept as the method, an embodiment of the invention further provides a user equipment including:

a transceiver, a processor, a memory, and a bus interface, wherein the processor and the memory are connected with the transceiver through the bus interface;

the transceiver is configured to receive data transmitted by a base station over multiple physical resources;

the processor is configured with one or more executable programs configured to perform a method including: detecting the data mapped onto the multiple physical resources according to mapping mode, wherein the number of pieces of data mapped onto the physical resources is no less than the number of physical resources, each piece of data is mapped onto at least one of the physical resources, and the number of physical resources onto which each piece of data is mapped is not exactly the same as each other; and the pieces of data are divided into multiple layers, wherein the data in different layers are multiplied with different weights, the weight of the preceding layer is more than the weight of the succeeding layer, and the different data in the same layer are multiplied with the same weight; and/or data in each layer are conjugated;

the memory is configured to store the one or more executable programs for configuring the processor; and the bus interface is configured to serve as an interface, the processor is responsible for managing the bus architecture and performing other normal processes, and the memory is configured to store data for use by the processor in operation.

The embodiments of the invention provide a method for transmitting data, a method for receiving and detecting data, a base station, and a user equipment, in a non-orthogonal mode. When transmitting data, the base station firstly maps plurality pieces of data onto physical resources by multiplying the data with the weights, and/or conjugating the data, wherein the number of physical resources is no more than the number of pieces of data, each piece of data is mapped onto at least one of the physical resources, and the number of physical resources onto which each piece of data is mapped is not exactly the same as each other, and the base station then transmits the data over the physical resources, so that more data are transmitted over less physical resources to thereby improve the data transmission capacity of the communication system.

DETAILED DESCRIPTION OF THE EMBODIMENTS

Embodiments of the invention provide a method for transmitting data, a method for receiving and detecting data, a base station, and a user equipment, in a non-orthogonal mode. When transmitting data, the base station firstly maps plurality pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other, and the base station then transmits the data over the physical resources, so that more data are transmitted over less physical resources to thereby improve the data transmission capacity of the communication system.

Figure 2:
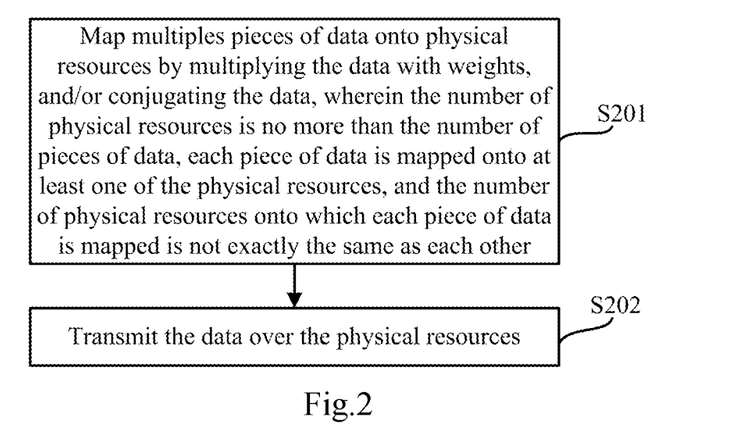
FIG. 2 is a flow chart of a method for transmitting data according to an embodiment of the invention.

As illustrated in FIG. 2, a method for transmitting data according to an embodiment of the invention includes:

The step S201 is to map multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other; and The step S202 is to transmit the data over the physical resources.

Since the number of physical resources over which the data are transmitted is less than the number of pieces of data, the data transmission capacity of the communication system can be improved.

With power control, the number of pieces of data transmitted over each physical resource can be more than the number of physical resources, but in order to avoid the resources from being wasted, the number of pieces of data mapped onto each physical resource is no more than the number of physical resources.

Preferably the data over the same physical resource can be transmitted by superimposition, that is, the data mapped onto the same physical resource are superimposed and then transmitted, where the data are superimposed linearly.

Preferably, when pieces of data are mapped, they can be divided into multiple layers, and data in different layers are multiplied with different weights, where the weight of the preceding layer is more than the weight of the succeeding layer, and the different data in the same layer are multiplied with the same weight; and/or conjugating data in each layer, where the number of physical resources onto which each piece of data in the preceding layer is mapped is larger than the number of physical resources onto which each piece of data in the succeeding layer is mapped. Furthermore the different data divided into the same layer may be mapped onto the same number of physical resources.

Furthermore the pieces of data may belong to the same user, or may belong to at least two users.

If the pieces of data belong to at least two users, then the base station will firstly divide N pieces of data of the at least two users into K layers; and then transmit the N pieces of data over a total number M of uncorrelated physical resources, where N>M; and each piece of data in the same layer is transmitted over the same number of uncorrelated physical resources, and the number of uncorrelated physical resources over which each piece of data in the layer is transmitted is larger than the number of uncorrelated physical resources over which each piece of data in the succeeding layer is transmitted.

The base station divides the N pieces of data of the users into M physical resources, and transmits the data over the M physical resources, and multiplies the data in different layers with different weights, where the weight of the preceding layer is more than the weight of the succeeding layer, and different data in the same layer are multiplied with the same weight; and/or conjugates data in each layer, where transmission diversity order of data in the succeeding layer is less than transmission diversity order of data in the preceding layer, and the diversity order of a data stream based upon successive interference cancellation receiver is the lowest in the first layer, and thereafter incrementing layer by layer. In the transmission solution according to the embodiment of the invention, the transmission diversity order of the data in the succeeding layer is less than the transmission diversity order of the data in the preceding layer, and the transmission diversity order of the data in the first layer is largest, so that the diversity order of data in each layer detected by successive interference cancellation receiver can be approximate to each other for the users to parse the data for their own data.

Here the transmission diversity order refers to the number of uncorrelated physical resources over which the data are transmitted. Data carried over two uncorrelated physical resources are uncorrelated; and if multiple pieces of data are carried over the same physical resource, then these pieces of data will be correlated. Typically multiple pieces of data are superimposed linearly and transmitted over the same physical resource.

With power control, the number of pieces of data transmitted over each physical resource can be more than M, that is, K can be more than M, but if K>M, then the resource may tend to be unnecessarily wasted. Typically if K is less than or equal to M, then the UE can parse the data for its own data. So, preferably the base station transmits not more than M pieces of data over each physical resource.

Preferably the base station can transmit the M pieces of data over all physical resources at some granularity to thereby alleviate the resources from being wasted, and also enable the respective users to parse accurately the data for their own data.

At receiving end, a signal is detected with successive interference cancellation reception mode. The reception diversity order of a data stream in the i-th layer based upon successive interference cancellation receiver is:

$$N_{diversity\ order} = N_R - N_T + i.$$

Where $N_R$ represents the sum of the transmission diversity order and the number of reception antennas of the data, and $N_T$ represents the number of transmission antennas of the data.

With detection based upon successive interference cancellation, the diversity order, brought in by detection, of the first layer of data detected by successive interference cancellation is the lowest, and the diversity order of the succeeding layer of detected data is the diversity order of the preceding layer of detected data plus 1. As can be apparent, the system performance of a receiver based on successive interference cancellation is determined by the accuracy of interference cancellation in the first layer. Hereupon an embodiment of the invention provides a transmission solution in a non-orthogonal joint design under such a general transmission principle that the transmission diversity order of the data in the preceding layer is more than the transmission diversity order of the data in the succeeding layer so that the diversity order of data in each layer as a result of successive interference cancellation can be approximate to each other.

Data streams can be mapped onto physical resources uncorrelated in one of the frequency, space, time, and other dimensions, or can be mapped onto physical resources uncorrelated in any two of the dimensions, or can be mapped onto physical resources uncorrelated in any more than two of the dimensions.

Figure 3A:
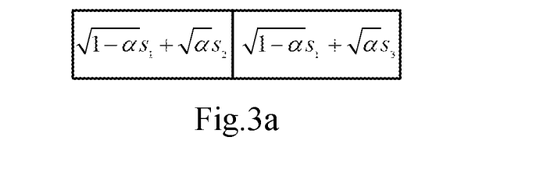
FIG. 3*a* is a schematic diagram of a particular implementation of 3-data transmission according to an embodiment of the invention.

By way of an example of three users, and two uncorrelated physical resources, their data are transmitted as follows as illustrated in FIG. 3a:

$$[s_1, s_2, s_3] \begin{bmatrix} \alpha_1 & \alpha_1 \\ \alpha_2 & 0 \\ 0 & \alpha_3 \end{bmatrix} = [\alpha_1 \cdot s_1 + \alpha_2 \cdot s_2 \quad \alpha_1 \cdot s_1 + \alpha_3 \cdot s_3],$$

Where $\alpha_1$ represents a power allocation factor of a user 1, $\alpha_2$ represents a power allocation factor of a user 2, $\alpha_3$ represents a power allocation factor of a user 3, and so on until $\alpha_n$ represents a power allocation factor of a user n.

The values of the power allocation factors are determined with such a general principle that a signal to noise ratio in each layer as a result of detection by successive interference cancellation receiver is the same or substantially the same.

$s_1$ transmitted by the user 1 for the first time is uncorrelated in time, frequency, or space with $s_1$ transmitted for the second time so that it can be provided with 2 diversity orders at the receiver. For the 1*2 Single Input Multiple Output (SIMO) system, the diversity order of the symbol $s_1$ of the user 1 is 2, so it will be the mostly reliable, and the first to detect, where the diversity of the signal $s_1$ as a result of detection by successive interference cancellation receiver is:

4=2*(2 symbols)+2*(2 reception antennas)−1+1.

After the first symbol $s_1$ is detected, the detected diversity orders of data $s_2$ and $s_3$ of the user 2 and the user 3 are:

4=1*(1 symbol)+2*(2 reception antennas)−1+2.

For a multi-data stream system, if the reception diversity order of each data stream is the same, then the transmit mode of each data stream is relatively reliable, and the same will apply to a system with more than two data streams.

Figure 3B:
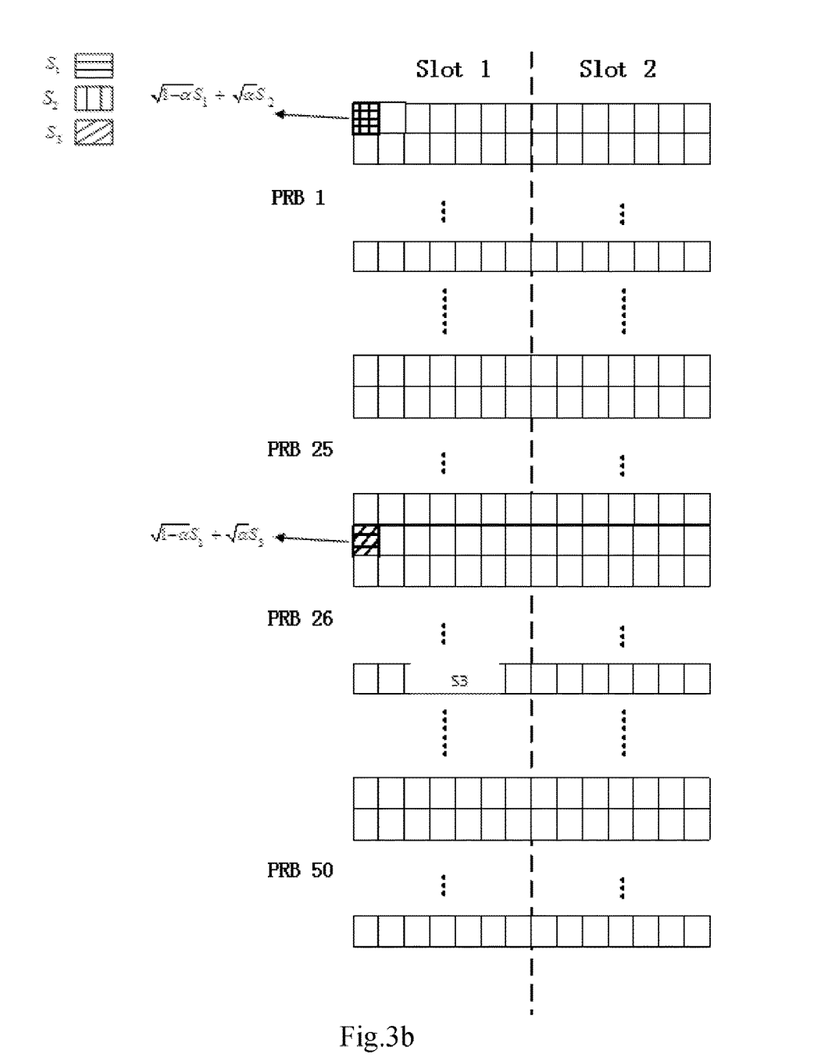
FIG. 3*b* is a schematic diagram of a particular implementation of 3-data transmission in an LTE system according to an embodiment of the invention.

Taking the LTE system as an example, if data streams need to be transmitted as described above, then they can be transmitted as illustrated in FIG. 3b where the ordinate represents the frequency, and the abscissa represents the time; and data of the user 1 and the user 2 are transmitted in the first frequency area, and the data of the user 1 and the user 3 are transmitted in the second frequency area.

Figure 3C:
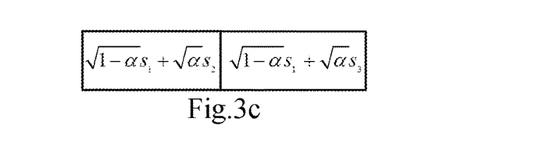
FIG. 3*c* is a schematic diagram of 2-data transmission according to an embodiment of the invention.

As illustrated in FIG. 3c, two pieces of data can also be transmitted over two orthogonal physical resources, and at this time, the user 2 can transmit two pieces of data $S_2$ and $S_2'$ respectively over two orthogonal physical resources.

Figure 4:
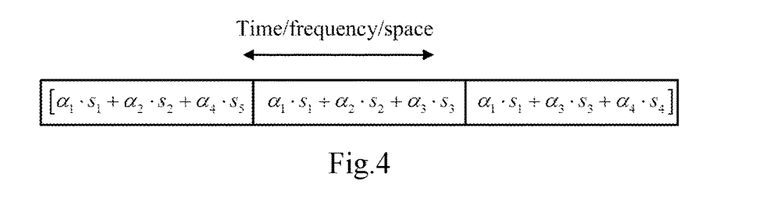
FIG. 4 is a schematic diagram of 5-data transmission according to an embodiment of the invention.

If there are five users and three orthogonal physical resources, then their data can be preferably transmitted as illustrated in FIG. 4 as follows:

$$[s_1, s_2, s_3, s_4, s_5] \begin{bmatrix} \alpha_1 & \alpha_1 & \alpha_1 \\ \alpha_2 & \alpha_2 & 0 \\ 0 & \alpha_3 & \alpha_3 \\ 0 & 0 & \alpha_4 \\ \alpha_5 & 0 & 0 \end{bmatrix} =$$

$$\begin{bmatrix} \alpha_1 \cdot s_1 + \alpha_2 \cdot s_2 + \alpha_5 \cdot s_5 & \alpha_1 \cdot s_1 + \alpha_2 \cdot s_2 + \alpha_3 \cdot s_3 & \alpha_1 \cdot s_1 + \alpha_3 \cdot s_3 + \alpha_4 \cdot s_4 \end{bmatrix},$$

Where $s_1$ represents data of the user 1, $s_2$ represents data of the user 2, $s_3$ represents data of the user 3, $s_4$ represents data of the user 4, $s_5$ represents data of the user 5, and so on until $s_n$ represents data of the user n.

That is, the data of the first, second, and fifth users are transmitted over the first physical resource, the data of the first, second, and third users are transmitted over the second physical resource, and the data of the first, third, and fourth users are transmitted over the third physical resource; and there is such a relationship among the transmission diversity orders of the data of respective users that the user 1>the user 2=the user 3>the user 4=the user 5. If both the number of transmission antennas and the number of reception antennas are 3, then the reception diversity orders of respective users will be:

$N_{div}^{s1}=3+3-3+1=4$;

$N_{div}^{s2}=N_{div}^{s3}=2+3-3+2=4$; and $N_{div}^{s4}=N_{div}^{s5}=1+3-3+3=4$.

Transmission of the data as illustrated in FIG. 4 can also be represented in the matrix of:

$$\begin{bmatrix} s_1 & s_2 & s_4 \\ s_2 & s_1 & s_3 \\ s_5 & s_3 & s_1 \end{bmatrix};$$

If N pieces of data are transmitted over a total number M of uncorrelated physical resources, then the base station can transmit the data as follows:

$$[s_1, s_2, \ldots, s_N] \begin{bmatrix} \alpha_1 & \alpha_1 & \alpha_1 & \ldots & \alpha_1 \\ 0 & \alpha_2 & \alpha_2 & \ldots & \alpha_2 \\ \alpha_3 & \alpha_3 & 0 & \ldots & \vdots \\ 0 & \vdots & \alpha_4 & \ldots & \alpha_4 \\ \alpha_5 & \vdots & \alpha_5 & \ldots & \vdots \\ \vdots & \vdots & \vdots & \ldots & \vdots \\ \alpha_{N-1} & \vdots & \vdots & \ldots & \vdots \\ 0 & \vdots & \vdots & \ldots & \alpha_N \end{bmatrix} =$$

$$\begin{bmatrix} \alpha_1 \cdot s_1 + \alpha_3 \cdot s_3 + \alpha_5 \cdot s_5 + \ldots + \alpha_{N-1} \cdot s_{N-1}, \\ \alpha_1 \cdot s_1 + \alpha_2 \cdot s_2 + \alpha_3 \cdot s_3 + \ldots + \alpha_{N-2} \cdot s_{N-2}, \\ \alpha_1 \cdot s_1 + \alpha_2 \cdot s_2 + \alpha_4 \cdot s_4 + \ldots +, \ldots, \\ \alpha_1 \cdot s_1 + \alpha_2 \cdot s_2 + \alpha_4 \cdot s_4 + \ldots + \alpha_N s_N \end{bmatrix},$$

Where $s_1$ to $s_N$ represent the N pieces of data respectively, and $$G = \begin{bmatrix} 1 & 1 & 1 & \ldots & 1 \\ 0 & 1 & 1 & \ldots & 1 \\ 1 & 1 & & \ldots & \vdots \\ 0 & \vdots & 1 & \ldots & 1 \\ 1 & \vdots & 1 & \ldots & \vdots \\ \vdots & \vdots & \vdots & \ldots & \vdots \\ 1 & \vdots & \vdots & \ldots & \vdots \\ 0 & \vdots & \vdots & \ldots & 1 \end{bmatrix}$$

represents an N*M-dimension generator matrix of non-orthogonal transmission, where the number of 1's in the respective rows in the matrix G corresponding to the same layer of data are the same, and the numbers of 1's in the respective rows of the matrix G are represented respectively as $n_1, n_2, n_3, \ldots, n_N$ with $n_1 \geq n_2 \geq n_3 \geq \ldots \geq n_N$.

Preferably the data can be layered and transmitted as follows:

$$[s_1, s_2, s_3, \ldots, s_N] \overset{\text{Layer 1} \quad \text{Layer 2} \quad \text{Layer } K}{\begin{bmatrix} \alpha_1 & \alpha_1 & \alpha_1 & \cdots & \alpha_1 \\ 0 & \alpha_2 & \alpha_2 & \cdots & \alpha_2 \\ \alpha_3 & \alpha_3 & 0 & \cdots & \vdots \\ 0 & \vdots & \alpha_4 & \cdots & \alpha_4 \\ \alpha_5 & \vdots & \alpha_5 & \cdots & \vdots \\ \vdots & \vdots & \vdots & \cdots & \vdots \\ \alpha_{N-1} & \vdots & \vdots & \cdots & \vdots \\ 0 & \vdots & \vdots & \cdots & \alpha_N \end{bmatrix}} \begin{matrix} \} \text{Row weight } n_1\text{: The data in the layer 1 are transmitted over} \\ n_1 \text{ different physical resources} \\ \} \text{Row weight of each row } n_2 = n_3\text{: The data in the layer 2 are} \\ \text{transmitted over } n_2 \text{ different physical resources} \\ \\ \\ \} \text{Row weight } n_N\text{: The data in the layer } K \text{ are transmitted} \\ \text{over } n_N \text{ different physical resources} \end{matrix} =$$

$$\begin{bmatrix} \alpha_1 \cdot s_1 + \alpha_3 \cdot s_3 + \alpha_5 \cdot s_5 + \ldots + \alpha_{N-1} \cdot s_{N-1}, \alpha_1 \cdot s_1 + \alpha_2 \cdot s_2 + \alpha_3 \cdot s_3 + \ldots + \alpha_{N-2} \cdot s_{N-2}, \alpha_1 \cdot s_1 + \\ \alpha_2 \cdot s_2 + \alpha_4 \cdot s_4 + \ldots, \ldots, \alpha_1 \cdot s_1 + \alpha_2 \cdot s_2 + \alpha_4 \cdot s_4 + \ldots + \alpha_N \cdot s_N \end{bmatrix}$$

Where the row weight refers to the number of 1's in the row, and the row weight is equal to the number of physical resources over which the corresponding data transmitted; and at this time $n_1 > n_2 = n_3 \geq \ldots \geq n_N$. $\alpha_i \cdot S_i$ represents the product of $\alpha_i$ and $S_i$.

Alternatively with K=M, the data can be transmitted as represented in the M-dimension square matrix, where if N is an even number, then $$M = \frac{N}{2};$$

and if N is an odd number, then $$M = \frac{N+1}{2}:$$

$$\begin{bmatrix} \alpha_1 \cdot s_1 & \alpha_2 \cdot s_2 & \alpha_4 \cdot s_4 & \ldots & \alpha_{N-1} \cdot s_{N-1} \\ \alpha_3 \cdot s_3 & \alpha_1 \cdot s_1 & \alpha_2 \cdot s_2 & \ldots & \ldots \\ \alpha_5 \cdot s_5 & \alpha_3 \cdot s_3 & \alpha_1 \cdot s_1 & \ldots & \alpha_4 \cdot s_4 \\ \ldots & \ldots & \ldots & \ldots & \alpha_2 \cdot s_2 \\ \alpha_{N-1} \cdot s_{N-1} & \ldots & \alpha_5 \cdot s_5 & \alpha_1 \cdot s_3 & \alpha_1 \cdot s_1 \end{bmatrix},$$

Figure 5:
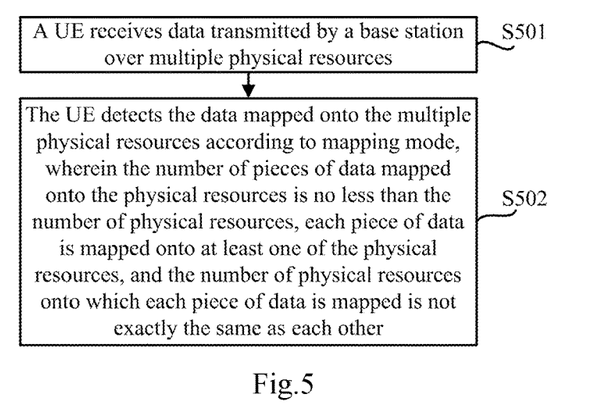
FIG. 5 is a flow chart of a method for receiving and detecting data according to an embodiment of the invention.

At this time the sum of the first row of data can be transmitted over the first physical resource: $\alpha_1 \cdot s_1 + \alpha_2 \cdot s_2 + \alpha_4 \cdot s_4 + \ldots + \alpha_N \cdot s_N$;

The sum of the second row of data can be transmitted over the second physical resource: $\alpha_3 \cdot s_3 + \alpha_1 \cdot s_1 + \alpha_2 \cdot s_2 + \ldots + \alpha_{N-2} \cdot s_{N-2}$;
. . . ; and The sum of the M-th row of data can be transmitted over the M-th physical resource: $\alpha_{N-1} \cdot s_{N-1} + \ldots + \alpha_5 \cdot s_5 + \alpha_3 \cdot s_3 + \alpha_1 \cdot s_1$;
Or The sum of the first column of data can be transmitted over the first physical resource: $\alpha_1 + \alpha_3 \cdot s_3 + \alpha_5 \cdot s_5 + \ldots + \alpha_{N-1} \cdot s_{N-1}$;

The sum of the second column of data can be transmitted over the second physical resource: $\alpha_2 \cdot s_2 + \alpha_1 \cdot s_1 + \alpha_3 \cdot s_3 + \ldots + \alpha_{N-3} \cdot s_{N-3}$;
. . . ; and The sum of the M-th column of data can be transmitted over the M-th physical resource: $\alpha_N \cdot s_N + \ldots + \alpha_4 \cdot s_4 + \alpha_2 + s_2 + \alpha_1 \cdot s_1$;

An embodiment of the invention further provides a corresponding method for receiving and detecting data as illustrated in FIG. 5, where the method includes:

In the step S501, a UE receives data transmitted by a base station over multiple physical resources; and In the step S502, the UE detects the data mapped onto the multiple physical resources according to mapping mode, where the number of pieces of data mapped onto the physical resources is no less than the number of physical resources, each piece of data is mapped onto at least one of the physical resources, and the number of physical resources onto which each piece of data is mapped is not exactly the same as each other.

With power control, the number of pieces of data transmitted over each physical resource can be more than the number of physical resources, but in order to avoid the resources from being wasted, the number of pieces of data mapped onto each physical resource is no more than the number of physical resources.

Preferably the data over the same physical resource can be transmitted by superimposing the data, that is, the data mapped onto the same physical resource are superimposed and then transmitted, where the data are superimposed linearly.

Preferably, when pieces of data is mapped, the pieces of data is conjugated, and divided into multiple layers, and data in different layers are multiplied with different weights, where the weight of the preceding layer is more than the weight of the succeeding layer, and the number of physical resources onto which each piece of data in the preceding layer is mapped is larger than the number of physical resources onto which each piece of data in the succeeding layer is mapped. Furthermore the different data divided into the same layer may be mapped onto the same number of physical resources.

Furthermore the pieces of data may belong to the same user, or may belong to at least two users, and the UE can detect the data for its own data.

Preferably the UE detects the data via the way of successive interference cancellation. The successive interference cancellation technology is generally that the data in respective layers are detected in sequence, and a detection result of the preceding layer is used for cancelling interference in the succeeding layer, so that data in the succeeding layer is detected with the result of cancelling the interference of data in the preceding layer.

Furthermore the UE preferentially detects the data in such a layer that each piece of data is mapped onto the larger number of physical resources.

Figure 6:
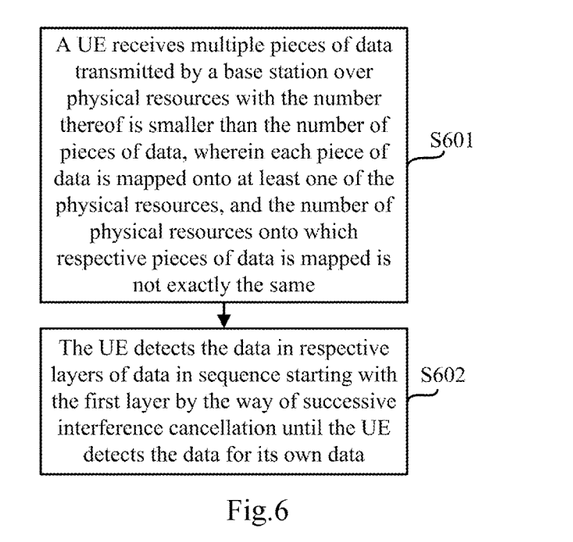
FIG. 6 is a schematic structural diagram of a base station according to an embodiment of the invention.

An embodiment of the invention provides a particular method for receiving and detecting data as illustrated in FIG. 6, where the method includes:

In the step S601, a UE receives multiple pieces of data transmitted by a base station over physical resources with the number thereof is smaller than the number of pieces of data, where each piece of data is mapped onto at least one of the physical resources, and the number of physical resources onto which respective pieces of data is mapped is not exactly the same; and In the step S602, the UE detects data in respective layers in sequence starting with the first layer by the way of successive interference cancellation until the UE detects the data for its own data.

Preferably particularly in the step S601, the UE receives N pieces of data transmitted to at least two users by the base station over M orthogonal physical resources, where M<N and:

The N pieces of data are divided into K layers, and transmitted over a total number M of uncorrelated physical resources; and each piece of data in the same layer is transmitted over the same number of uncorrelated physical resources, and the number of uncorrelated physical resources over which each piece of data in the layer is transmitted is larger than the number of uncorrelated physical resources over which each piece of data in the succeeding layer is transmitted.

If the data in respective layers are detected in sequence starting with the first layer, then the average calculation complexity of respective users will be lower.

Still taking as an example three users and two orthogonal physical resources as illustrated in FIG. 3*a*, the user 1 receives the following signals:

$$y_{11} = h_{11}(\sqrt{1-\alpha}s_1 + \sqrt{\alpha}s_2) + n_{11}$$

$$y_{12} = h_{12}(\sqrt{1-\alpha}s_1 + \sqrt{\alpha}s_3) + n_{12},$$

Where $h_{11}$ represents a channel matrix traversed by the first half of symbol, and $h_{12}$ represents a channel matrix traversed by the second half of symbol.

$s_2$ and $s_3$ are regarded as interference signals and detected as follows:

The first step is to normalize the received signals:

$$\frac{y_{11}}{\sqrt{1-\alpha}} = h_{11}\left(s_1 + \frac{\sqrt{\alpha}}{\sqrt{1-\alpha}}s_2\right) + \frac{n_{11}}{\sqrt{1-\alpha}}$$

$$\frac{y_{12}}{\sqrt{1-\alpha}} = h_{12}\left(s_1 + \frac{\sqrt{\alpha}}{\sqrt{1-\alpha}}s_3\right) + \frac{n_{12}}{\sqrt{1-\alpha}};$$

and

The second step is to detect $LLR_1(s_1)$ and $LLR_2(s_1)$ respectively by the receiver with the Minimum Mean Square Error (MMSE) algorithm.

$LLR_1(s_1)+LLR_2(s_1)$ is detected softly for i $\hat{s}_1$.

The user 2 (a low-diversity order user) receives the following signals:

$$y_{21} = h_{21}(\sqrt{1-\alpha}s_1 + \sqrt{\alpha}s_2) + n_{21}$$

$$y_{22} = h_{22}(\sqrt{1-\alpha}s_1 + \sqrt{\alpha}s_3) + n_{22},$$

Firstly $s_1$ is detected for $\hat{s}_1$, then $\hat{s}_1$ is cancelled from $\hat{s}$, and next $s_2$ and $s_3$ are detected.

The first step is to normalize the received signals:

$$\frac{y_{21}}{\sqrt{1-\alpha}} = h_{21}\left(s_1 + \frac{\sqrt{\alpha}}{\sqrt{1-\alpha}}s_2\right) + \frac{n_{21}}{\sqrt{1-\alpha}}$$

$$\frac{y_{22}}{\sqrt{1-\alpha}} = h_{22}\left(s_1 + \frac{\sqrt{\alpha}}{\sqrt{1-\alpha}}s_3\right) + \frac{n_{22}}{\sqrt{1-\alpha}};$$

$$s_1 + \sqrt{\frac{\alpha}{1-\alpha}}s_2 \text{ and } s_1 + \sqrt{\frac{\alpha}{1-\alpha}}s_3$$

The second step is to let represented respectively as x(1) and x(2), and to detect the signals via MMSE for:

$$\hat{x}(1) = W_{mmse}\frac{y_{21}}{\sqrt{1-\alpha}} = \tilde{s}_1 + W_{mmse}\frac{n_{21}}{\sqrt{1-\alpha}}, \text{ and,}$$

$$\hat{x}(2) = W_{mmse}\frac{y_{22}}{\sqrt{1-\alpha}} = \tilde{s}_1 + W_{mmse}\frac{n_{22}}{\sqrt{1-\alpha}}$$

$LLR_1(T(1))+LLR_2(T(2))$ is detected softly for $\hat{s}_1$;

The third step is to decode LLR values of softly detected $\hat{s}_1$ so that the signals of the user 1 are detected so accurately that there is approximately no error in a result after decoding, and to softly modulate the result after decoding into a softly modulated symbol $\tilde{s}_1$; and The fourth step is to cancel interference of $\tilde{s}_1$ resulting in $\hat{s}_1$ and $\hat{s}_3$:

$$\hat{s}_2 = \frac{W_{mmse}y_{21} - \sqrt{1-\alpha}\,\tilde{s}_1}{\sqrt{\alpha}}, \text{ and}$$

$$\hat{s}_3 = \frac{W_{mmse}y_{22} - \sqrt{1-\alpha}\,\tilde{s}_1}{\sqrt{\alpha}}.$$

The same detection flow applies to the third user.

Figure 7:
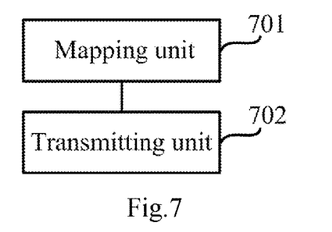
FIG. 7 is a schematic diagram of a user equipment according to an embodiment of the invention.

An embodiment of the invention further provides a corresponding base station as illustrated in FIG. 7, where the base station includes:

A mapping unit 701 is configured to map multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other; and A transmitting unit 702 is configured to transmit the data over the physical resources.

Preferably the number of pieces of data mapped onto each physical resource is no more than the number of physical resources.

Preferably the data mapped onto the same physical resource are superimposed and then transmitted.

Furthermore the data are superimposed linearly.

Preferably the pieces of data are divided into multiple layers, where the number of physical resources onto which each piece of data in the preceding layer is mapped is larger than the number of physical resources onto which each piece of data in the succeeding layer is mapped.

Furthermore the data in different layers are multiplied with different weights, where the weight of the preceding layer is more than the weight of the succeeding layer, and the different data in the same layer are multiplied with the same weight; and/or data in each layer are conjugated.

Preferably the different data divided into the same layer are mapped onto the same number of physical resources.

Furthermore the pieces of data belong to at least two users.

Figure 8:
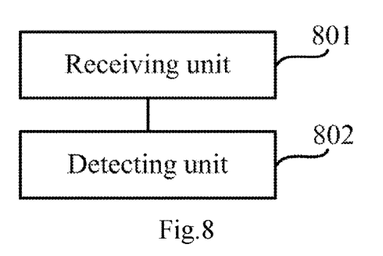
FIG. 8 is a schematic diagram of a user equipment according to an embodiment of the invention.

An embodiment of the invention further provides a user equipment as illustrated in FIG. 8, where the user equipment includes:

A receiving unit 801 is configured to receive data transmitted by a base station over multiple physical resources; and A detecting unit 802 is configured to detect the data mapped onto the multiple physical resources according to mapping mode, where the number of pieces of data mapped onto the physical resources is no less than the number of physical resources, each piece of data is mapped onto at least one of the physical resources, and the number of physical resources onto which each piece of data is mapped is not exactly the same as each other.

Preferably the number of pieces of data mapped onto each physical resource is no more than the number of physical resources.

Preferably the data mapped onto the same physical resource are multiplied with the same weight, and superimposed and then transmitted.

Furthermore the data are superimposed linearly.

Preferably the pieces of data are divided into multiple layers, where the number of physical resources onto which each piece of data in the preceding layer is mapped is larger than the number of physical resources onto which each piece of data in the succeeding layer is mapped.

Preferably the different data divided into the same layer are mapped onto the same number of physical resources.

Preferably the pieces of data belong to at least two users, and the UE detects the data for its own data.

Furthermore the UE detects data by the way of successive interference cancellation.

Still furthermore the UE preferentially detects data in such a layer that each piece of data is mapped onto the larger number of physical resources.

An embodiment of the invention further provides a base station including:

A processor is configured to map multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other; and to transmit the data over the physical resources.

The base station can be further configured to perform the other functions in the method for transmitting data according to the embodiment of the invention.

The base station can transmit the data through a transceiver module and a radio interface.

An embodiment of the invention further provides a user equipment including:

A processor is configured to receive data transmitted by a base station over multiple physical resources; and to detect the data mapped onto the multiple physical resources according to mapping mode, where the number of pieces of data mapped onto the physical resources is no less than the number of physical resources, each piece of data is mapped onto at least one of the physical resources, and the number of physical resources onto which each piece of data is mapped is not exactly the same as each other.

The user equipment can be further configured to perform the other functions in the method for receiving and detecting data according to the embodiment of the invention.

The user equipment can receive the data through a transceiver module and a radio interface.

Figure 9:
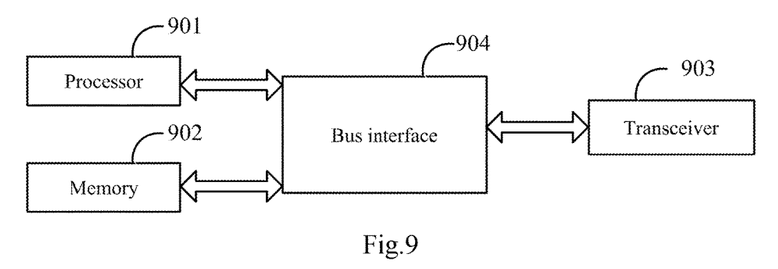
FIG. 9 is a schematic structural diagram of a base station according to an embodiment of the invention.

Based upon the same inventive concept as the method, an embodiment of the invention further provides a base station as illustrated in FIG. 9, where the base station includes:

A transceiver 903, a processor 901, a memory 902, and a bus interface 904, where the processor 901 and the memory 902 are connected with the transceiver 903 via the bus interface 904.

The processor 901 is configured with one or more executable programs configured to perform a method including: mapping multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other;

The transceiver 903 is configured to transmit the data over the physical resources;

The memory 902 is configured to store the one or more executable programs for configuring the processor 901; and The bus interface 904 is configured to serve as an interface, the processor 901 is responsible for managing the bus architecture and performing other normal processes, and the memory 902 can be configured to store data for use by the processor 901 in operation.

The bus architecture can include any number of interconnected buses and bridges to link together various circuits including one or more processors represented by the processor, and one or more memories represented by the memory. The bus architecture can further link together various other circuits, e.g., peripheral devices, a voltage stabilizer, a power management circuit, etc., and all of these circuits are well known in the art, so a further description thereof will be omitted in this context.

Figure 10:
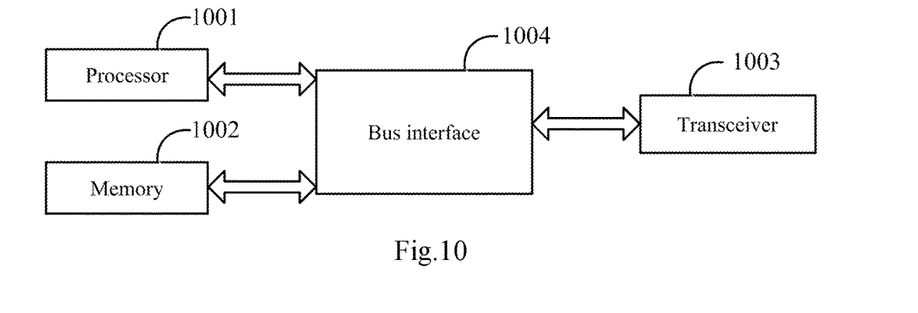
FIG. 10 is a schematic structural diagram of a user equipment according to an embodiment of the invention.

Based upon the same inventive concept as the method, an embodiment of the invention further provides a base station as illustrated in FIG. 10, where the base station includes:

A transceiver 1003, a processor 1001, a memory 1002, and a bus interface 1004, where the processor 1001 and the memory 1002 are connected with the transceiver 1003 via the bus interface 1004.

The transceiver 1003 is configured to receive data transmitted by a base station over multiple physical resources;

The processor 1001 is configured with one or more executable programs configured to perform a method including: detecting the data mapped onto the multiple physical resources according to mapping mode, where the number of pieces of data mapped onto the physical resources is no less than the number of physical resources, each piece of data is mapped onto at least one of the physical resources, and the number of physical resources onto which each piece of data is mapped is not exactly the same as each other; and the pieces of data are divided into multiple layers, data in different layers are multiplied with different weights, and the weight of the preceding layer is more than the weight of the succeeding layer, and different data in the same layer are multiplied with the same weight; and/or data in each layer are conjugated.

The memory 1002 is configured to store the one or more executable programs for configuring the processor 1001; and The bus interface 1004 is configured to serve as an interface, the processor 1001 is responsible for managing the bus architecture and performing other normal processes, and the memory 1002 can be configured to store data for use by the processor 1001 in operation.

The bus architecture can include any number of interconnected buses and bridges to link together various circuits including one or more processors represented by the processor, and one or more memories represented by the memory. The bus architecture can further link together various other circuits, e.g., peripheral devices, a voltage stabilizer, a power management circuit, etc., and all of these circuits are well known in the art, so a further description thereof will be omitted in this context.

The embodiments of the invention provide a method for transmitting data, a method for receiving and detecting data, a base station, and a user equipment, in a non-orthogonal mode. When transmitting data, the base station firstly maps plurality pieces of data onto physical resources by multiplying the data with weights, and/or conjugating the data, the number of physical resources is no more than the number of pieces of data, each piece of data is mapped onto at least one of the physical resources, and the number of physical resources onto which each piece of data is mapped is not exactly the same as each other, and the base station then transmits the data over the physical resources, so that more data are transmitted over less physical resources to thereby improve the data transmission capacity of the communication system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data, the method comprising:
mapping multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other; and
transmitting the data over the physical resources.

2. The method according to claim 1, wherein the number of pieces of data mapped onto each physical resource is no more than the number of physical resources.

3. The method according to claim 2, wherein the data mapped onto the same physical resource are superimposed and then transmitted.

4. The method according to claim 3, wherein the data are superimposed linearly.

5. The method according to claim 1, wherein the pieces of data are divided into multiple layers, wherein the number of physical resources onto which each piece of data in the preceding layer is mapped is larger than the number of physical resources onto which each piece of data in the succeeding layer is mapped.

6. The method according to claim 5, wherein the different data divided into the same layer are mapped onto the same number of physical resources.

7. The method according to claim 5, wherein the data in different layers are multiplied with different weights, wherein the weight of the preceding layer is more than the weight of the succeeding layer, and the different data in the same layer are multiplied with the same weight.

8. The method according to claim 1, wherein the pieces of data belong to at least two users.

9. A method for receiving and detecting data, the method comprising:
receiving, by a User Equipment, UE, data transmitted by a base station over multiple physical resources; and
detecting by the UE, the data mapped onto the multiple physical resources according to mapping mode, wherein the number of pieces of data mapped onto the physical resources is no less than the number of physical resources, each piece of data is mapped onto at least one of the physical resources, and the number of physical resources onto which each piece of data is mapped is not exactly the same as each other; and the pieces of data are divided into multiple layers, wherein the data in different layers are multiplied with different weights, the weight of the preceding layer is more than the weight of the succeeding layer, and the different data in the same layer are multiplied with the same weight; and/or data in each layer are conjugated.

10. A base station, comprising:
a transceiver, a processor, a memory, and a bus interface, wherein the processor and the memory are connected with the transceiver through the bus interface;
the processor is configured with one or more executable programs configured to perform a method comprising: mapping multiples pieces of data onto physical resources by multiplying the data with weights, and/or conjugating the data, wherein the number of physical resources is no more than the number of pieces of data, each piece of data is mapped onto at least one of the physical resources, and the number of physical resources onto which each piece of data is mapped is not exactly the same as each other;
the transceiver is configured to transmit the data over the physical resources;
the memory is configured to store the one or more executable programs for configuring the processor; and
the bus interface is configured to serve as an interface.

11. The base station according to claim 10, wherein the number of pieces of data mapped onto each physical resource is no more than the number of physical resources.

12. The base station according to claim 11, wherein the data mapped onto the same physical resource are superimposed and then transmitted.

13. The base station according to claim 12, wherein the data are superimposed linearly.

14. The base station according to claim 10, wherein the pieces of data are divided into multiple layers, wherein the number of physical resources onto which each piece of data in the preceding layer is mapped is larger than the number of physical resources onto which each piece of data in the succeeding layer is mapped.

15. The base station according to claim 14, wherein the different data divided into the same layer are mapped onto the same number of physical resources.

16. The base station according to claim 10, wherein the pieces of data belong to at least two users.

* * * * *